(12) United States Patent
Sadakane

(10) Patent No.: US 12,490,349 B2
(45) Date of Patent: Dec. 2, 2025

(54) GLASS PLATE WITH ELECTRIC HEATING WIRE

(71) Applicant: AGC Inc., Tokyo (JP)

(72) Inventor: Shunsuke Sadakane, Tokyo (JP)

(73) Assignee: AGC INC., Tokyo (JP)

( * ) Notice: Subject to any disclaimer, the term of this patent is extended or adjusted under 35 U.S.C. 154(b) by 842 days.

(21) Appl. No.: 17/748,552

(22) Filed: May 19, 2022

(65) Prior Publication Data

US 2022/0279628 A1    Sep. 1, 2022

Related U.S. Application Data

(63) Continuation of application No. PCT/JP2020/037406, filed on Oct. 1, 2020.

(30) Foreign Application Priority Data

Nov. 26, 2019    (JP) .................................. 2019-213617

(51) Int. Cl.
*H05B 3/86* (2006.01)
*B60J 1/00* (2006.01)

(52) U.S. Cl.
CPC ................ *H05B 3/86* (2013.01); *B60J 1/001* (2013.01); *H05B 2203/003* (2013.01); *H05B 2214/02* (2013.01)

(58) Field of Classification Search
CPC . H05B 3/86; H05B 2203/003; H05B 2214/02
(Continued)

(56) References Cited

U.S. PATENT DOCUMENTS

2016/0316192 A1    10/2016    Kishiwada
2021/0001695 A1*    1/2021    Ogawa ..................... H05B 3/84

FOREIGN PATENT DOCUMENTS

CN        106101686 A        11/2016
JP        2007290549 A    *    11/2007
(Continued)

OTHER PUBLICATIONS

International Searching Authority, "International Search Report," issued in connection with International Patent Application No. PCT/JP2020/037406, dated Nov. 24, 2020.
(Continued)

*Primary Examiner* — Steven W Crabb
*Assistant Examiner* — Alba T Rosario-Aponte
(74) *Attorney, Agent, or Firm* — Foley & Lardner LLP

(57) ABSTRACT

A glass plate with an electric heating wire includes a glass plate having an information acquisition area through which information outside a vehicle is acquired by an information acquisition apparatus; and an electric heating wire provided in the information acquisition area. When the glass plate is mounted to a vehicle body in an inclined state, the information acquisition area has a rectangular shape viewed from a direction of an optical axis of the information acquisition apparatus, and has horizontal upper and lower sides. A plurality of streaks caused by waviness of the glass plate are arranged at intervals in a lateral direction parallel to the upper and lower sides, each streak extending in a vertical direction perpendicular to the lateral direction. The electric heating wire has a vertical portion that vertically traverses the information acquisition area. A plurality of vertical portions are provided at intervals in the lateral direction.

12 Claims, 15 Drawing Sheets

(58) Field of Classification Search
USPC .......................................................... 219/203
See application file for complete search history.

(56) References Cited

FOREIGN PATENT DOCUMENTS

| JP | 2016-204249 A | | 12/2016 | |
|---|---|---|---|---|
| JP | 2017114484 A | * | 6/2017 | |
| JP | 2018115091 A | * | 7/2018 | ....... B32B 17/10036 |
| WO | WO-2008/040472 A1 | | 4/2008 | |
| WO | WO-2015105025 A1 | * | 7/2015 | ............. C03B 23/03 |
| WO | WO-2017/065114 A1 | | 4/2017 | |
| WO | WO-2017204291 A1 | * | 11/2017 | ....... B32B 17/10036 |
| WO | WO-2019/107460 A1 | | 6/2019 | |
| WO | WO-2019131803 A1 | * | 7/2019 | ............. B60K 35/50 |

OTHER PUBLICATIONS

International Searching Authority, "Written Opinion," issued in connection with International Patent Application No. PCT/JP2020/037406, dated Nov. 24, 2020.

* cited by examiner

FIG.1
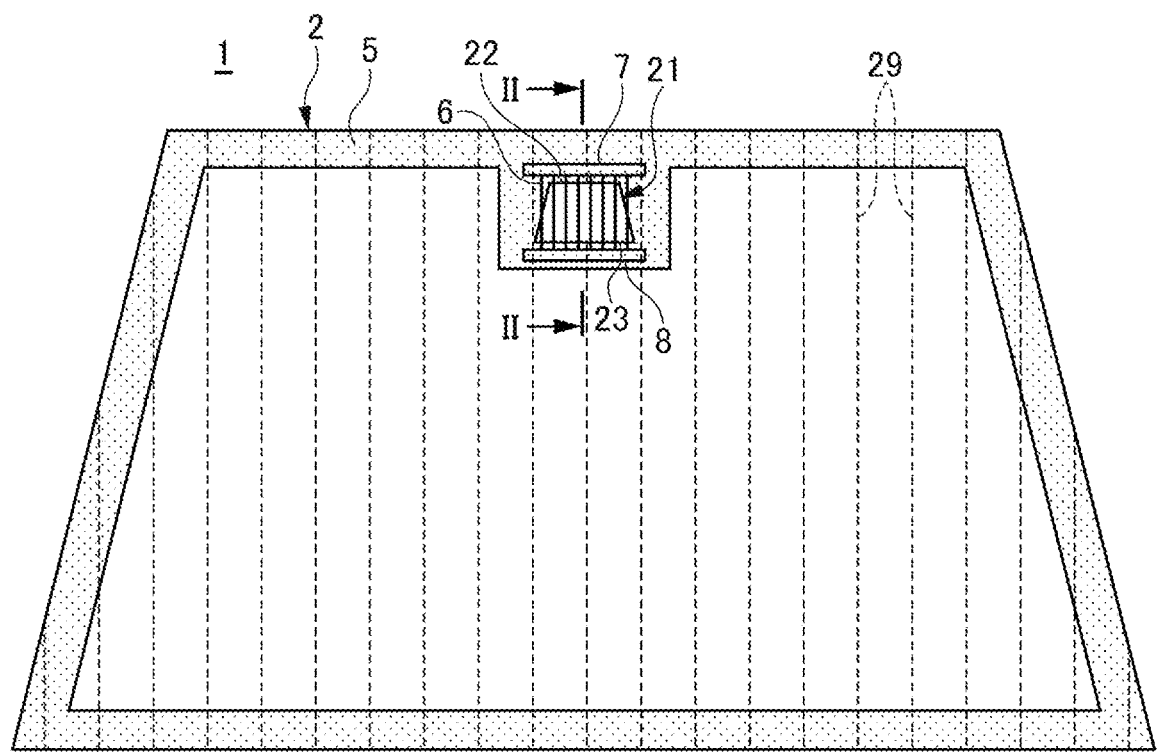
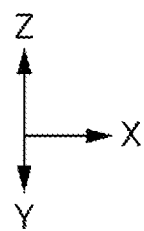

FIG.4
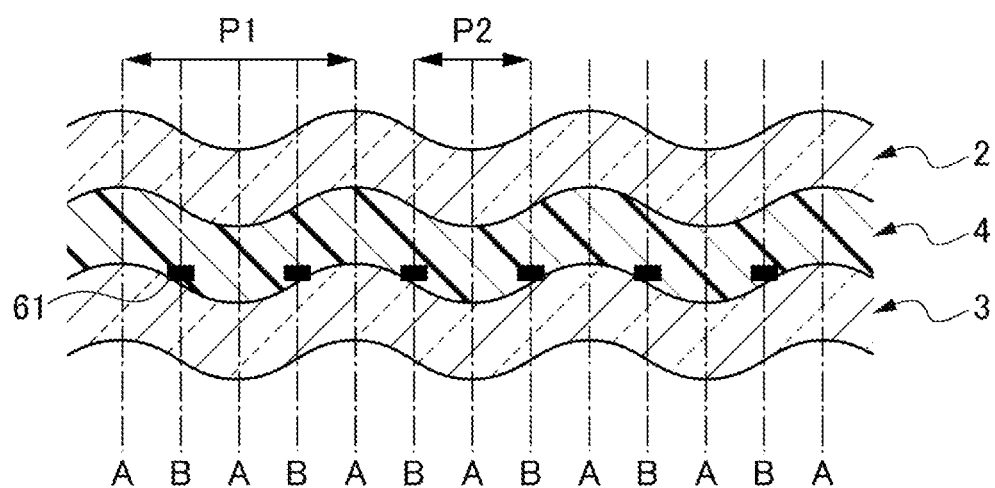
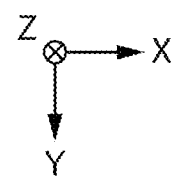

FIG.6
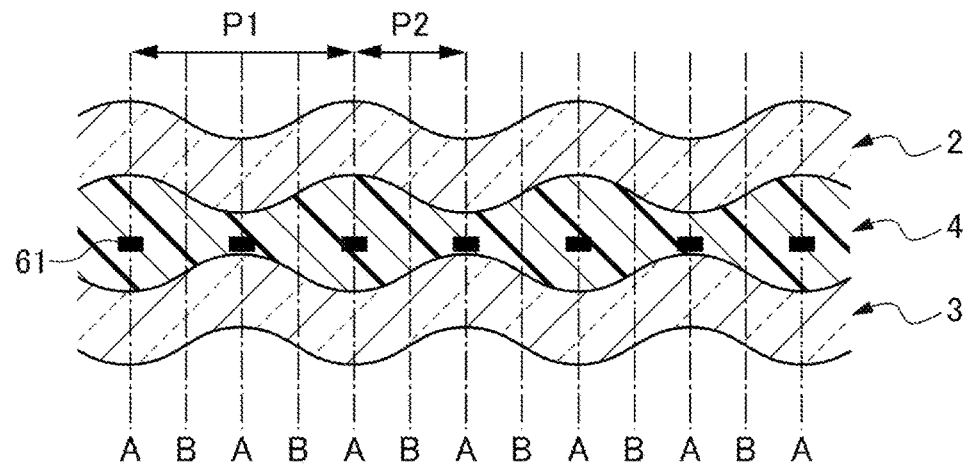
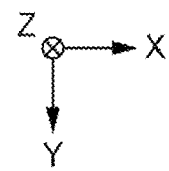
FIG.7
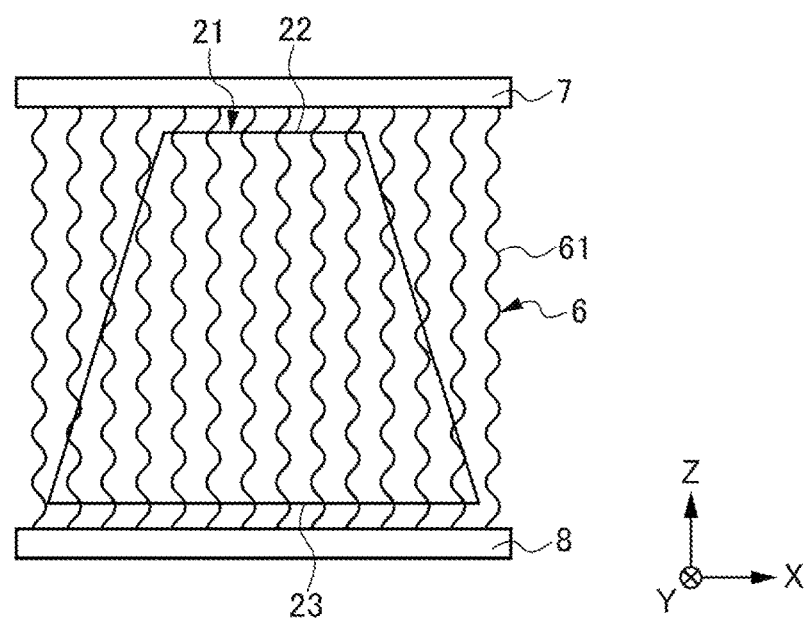

GLASS PLATE WITH ELECTRIC HEATING WIRE

CROSS-REFERENCE TO RELATED APPLICATION

The present application is a continuation application of International Application No. PCT/JP2020/037406, filed Oct. 1, 2020, which claims priority to Japanese Patent Application No. 2019-213617 filed Nov. 26, 2019. The contents of these applications are incorporated herein by reference in their entirety.

BACKGROUND OF THE INVENTION

1. Field of the Invention

The present invention relates to a glass plate with an electric heating wire.

2. Description of the Related Art

WO 2017/065114 discloses laminated glass. The laminated glass includes a first glass plate, a second glass plate disposed opposite to the first glass plate, and an intermediate layer disposed between the first glass plate and the second glass plate. The intermediate layer is provided with a first bus bar, a second bus bar, and a plurality of electric heating wires connecting the first bus bar and the second bus bar. Electric heating wires generate heat by being supplied with electric power, and remove fog (water droplets) or ice on a surface of the laminated glass.

In recent years, a variety of information acquisition apparatuses have been installed in vehicles to support travelling of the vehicles. The information acquisition apparatus includes, for example, a light receiving element that receives visible light or infrared light, and acquires an image outside the vehicle by the light receiving element. The laminated glass has an information acquisition area through which information is acquired by the information acquisition apparatus. Electric heating wires are provided in the information acquisition area to remove fog or ice.

SUMMARY OF INVENTION

Problem to be Solved by the Invention

The information acquisition apparatus acquires information outside the vehicle through a glass plate mounted to a vehicle body in an inclined state.

Conventionally, an acquisition performance for information by the information acquisition apparatus may be degraded by streaks caused by waviness of the glass plate and a distribution of refractive index caused by heat generated by the electric heating wire.

According to an aspect of the present disclosure, a technique capable of improving an acquisition performance for information by an information acquisition apparatus, is provided.

Means for Solving the Problem

According to an aspect of the present disclosure, a glass plate with an electric heating wire includes a glass plate having an information acquisition area through which information outside a vehicle is acquired by an information acquisition apparatus; and an electric heating wire provided in the information acquisition area. When the glass plate is mounted to a vehicle body in an inclined state, the information acquisition area has a rectangular shape viewed from a direction of an optical axis of the information acquisition apparatus, and has a horizontal upper side and a horizontal lower side. A plurality of streaks caused by waviness of the glass plate are arranged at intervals in a lateral direction parallel to the upper side and the lower side, each streak extending in a vertical direction perpendicular to the lateral direction. The electric heating wire has a vertical portion that vertically traverses the information acquisition area. A plurality of vertical portions are provided at intervals in the lateral direction.

Effects of the Invention

According to an aspect of the present disclosure, a performance of acquiring information by an information acquisition apparatus can be improved.

BRIEF DESCRIPTION OF DRAWINGS

Other objects and further features of the present disclosure will be apparent from the following detailed description when read in conjunction with the accompanying drawings, in which:

FIG. 1 is a diagram depicting an example of a glass plate with an electric heating wire according to an embodiment viewed from a direction of an optical axis of an information acquisition apparatus;

FIG. 4 is a cross-sectional view of the glass plate cut along a line IV-IV in FIG. 2;

FIG. 6 is a cross-sectional view depicting a glass plate according to a variation of FIG. 4;

FIG. 7 is a diagram depicting a first example of a pattern of the electric heating wire viewed in the Y-axis direction;

DESCRIPTION OF THE PREFERRED EMBODIMENT

Figure 2:
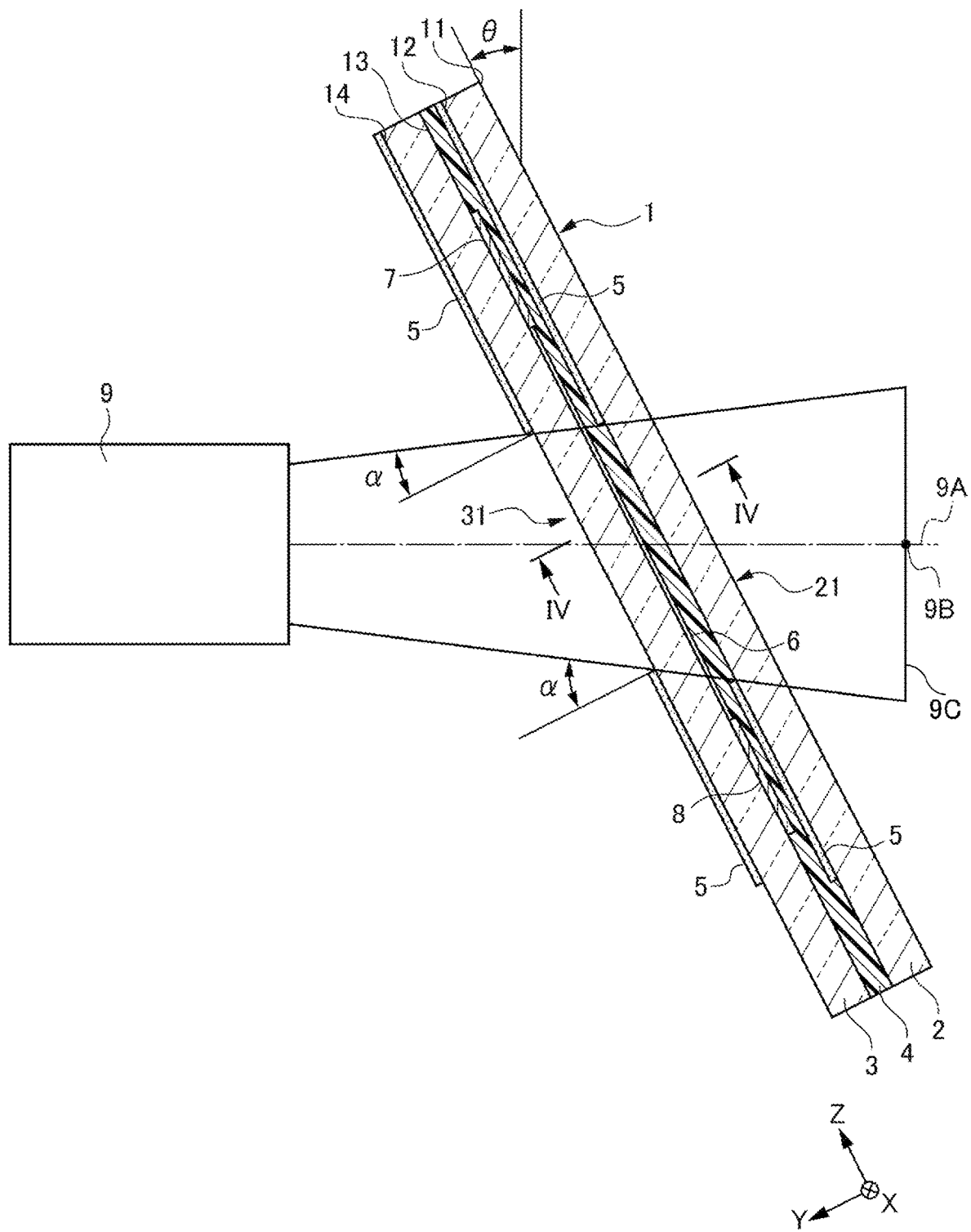
FIG. 2 is a cross-sectional view of the glass plate cut along a line II-II in FIG. 1.

In the following, embodiments of the present disclosure will be described with reference to the accompanying drawings. In each drawing, to the same or corresponding configurations, the same reference numeral will be assigned, and an explanation may be omitted. In each drawing, an X-axis direction, a Y-axis direction, and a Z-axis direction are orthogonal to each other. In the specification, a symbol "-" representing a numerical range indicates that values before and after the symbol are included as a lower limit value and an upper limit value, respectively.

As shown in FIG. 2, a laminated glass 1 includes a first glass plate 2, a second glass plate 3 facing the first glass plate 2, and an intermediate film 4 bonding the first glass plate 2 and the second glass plate 3. The first glass plate 2 is provided on an exterior side of the second glass plate 3, and the second glass plate 3 is provided on an interior side of the first glass plate 2. In the present embodiment, the second glass plate 3 is provided on the interior side of the first glass plate 2, but may be provided on the exterior side of the first glass plate 2. In addition, a number of sheets of glass constituting the laminated glass 1 may be three or more. In the case where the number of sheets of glass constituting the laminated glass 1 is three or more, the number of the intermediate films 4 may be two or more. When the number of sheets of glass constituting the laminated glass 1 is three, a thickness of the glass plate on the interior side is preferably smaller than a thickness of the glass plate on the exterior side and a thickness of the intermediate glass plate.

The first glass plate 2 may be either inorganic glass or organic glass. Suitable inorganic glass may include, for example, soda lime glass, and aluminosilicate glass. The inorganic glass may be either non-tempered glass or tempered glass. The non-tempered glass is obtained by forming molten glass into a plate shape and annealing slowly. The tempered glass is obtained by forming a compressive stress layer on a surface of the non-tempered glass. The tempered glass may be either physically tempered glass (e.g., air-cooled tempered glass) or chemically tempered glass. In contrast, the organic glass may include a transparent resin such as a polycarbonate, an acrylic resin, a polyvinyl chloride, or a polystyrene. The acrylic resin is, for example, polymethylmethacrylate. The second glass plate 3 may be either inorganic glass or organic glass in the same manner as the first glass plate 2.

The first glass plate 2 is formed in a convex shape toward the exterior of the vehicle. For bending the first glass plate 2, a gravity forming method, a press forming method, or the like is used. When the first glass plate 2 is a physically tempered glass, a glass surface may be tempered by rapidly cooling a uniformly heated glass plate in bending from a temperature near the softening point and generating compressive stress on the glass surface due to a temperature difference between the glass surface and an inside of the glass. When the first glass plate 2 is a chemically tempered glass, the glass surface may be tempered by generating compressive stress on the glass surface by an ion exchange method or the like after bending. In the same manner as the first glass plate 2, the second glass plate 3 is also formed into a convex shape toward the exterior of the vehicle.

Since the first glass plate 2 is provided on an exterior side of the second glass plate 3 of the vehicle, the first glass plate 2 has a thickness of 1.8 mm or more in order to prevent an occurrence of scratch due to flying stones. The thickness of the first glass plate 2 is 3.0 mm or less from the point of view of reduction of weight and formability. The thickness of the first glass plate 2 may be constant or may vary depending on the position.

Since the second glass plate 3 is provided on an interior side of the first glass plate 2 of the vehicle, the second glass plate 3 may be thinner than the first glass plate 2. The thickness of the second glass plate 3 is 0.3 mm or more from the viewpoint of handleability. The thickness of the second glass plate 3 is 2.3 mm or less from the viewpoint of reduction of weight and formability. The thickness of the second glass plate 3 may be constant or may vary depending on the position.

The intermediate film 4 is formed of a typical resin, for example, thermoplastic resin such as polyvinyl butyral resin (PVB), ethylene-vinyl acetate copolymer resin (EVA), urethane, or ionomer resin. When the intermediate film 4 is heated, adhesiveness becomes manifested. The intermediate film 4 may be a single-layer structure or a multi-layer structure. For example, the intermediate film 4 may include one or more selected from a sound insulation layer, a colored transparent layer, an ultraviolet cut layer, and an infrared cut layer.

The thickness of the intermediate film 4 is 0.5 mm or more from the viewpoint of adhesiveness. In addition, the thickness of the intermediate film 4 is 3 mm or less from the viewpoint of reduction of weight and handleability. The thickness of the intermediate film 4 may be constant or may vary depending on the position. For example, when an image of a head-up display is projected onto the laminated glass 1, the thickness of the intermediate film 4 increases from the lower side to the upper side in order to suppress an occurrence of a double image. The intermediate film 4 is formed in a shape of a wedge, and a wedge angle is, for example, 1.0 mrad or less.

A laminated product is prepared by overlaying the first glass plate 2 and the second glass plate 3 through the intermediate film 4. The laminated product is subjected to a pressure and heat treatments by an autoclave or the like, and thereby the laminated glass 1 is obtained. Prior to preparing the laminated product, the first glass plate 2 and the second glass plate 3 are subjected to the heat treatment and bent. The method of producing the laminated glass 1 may be a general method, and may not include the pressure and heat treatments by an autoclave or the like.

The laminated glass 1 is used, for example, as a front windshield of a vehicle. In this case, an adhesive is applied to a periphery of the laminated glass 1 to adhere the laminated glass 1 to the vehicle body. The adhesive is, for example, urethane. In order to suppress deterioration of the adhesive due to ultraviolet light, a light shielding film 5 is formed at the periphery of the laminated glass 1. The light shielding film 5 is formed by firing, for example, a black ceramic paste. The black ceramic paste is applied to the first glass plate 2 or the second glass plate 3 and fired simultaneously with bending the first glass plate 2 or the second glass plate 3.

Among the first surface 11, the second surface 12, a third surface 13, and a fourth surface 14 of the laminated glass 1, the light shielding film 5 is formed on, for example, both the second surface 12 and the fourth surface 14. The first surface 11 is a main surface of the first glass plate 2 directed to outside the vehicle. The second surface 12 is a main surface of the first glass plate 2 directed to inside the vehicle. The third surface 13 is a main surface of the second glass plate 3 directed to outside the vehicle. The fourth surface 14 is the main surface of the second glass plate 3 directed to inside the vehicle. The light shielding film 5 may be formed on only one of the second surface 12 and the fourth surface 14.

The laminated glass 1 may include, in addition to the first glass plate 2, the second glass plate 3, the intermediate film 4, and the light shielding film 5, one or more selected from, for example, a water-repellent layer, an ultraviolet cut layer, an infrared cut layer, a heat-insulation layer, and a colored transparent layer. The heat insulation layer has a function of suppressing radiation heat transfer. The colored transparent layer has an anti-glare function that reduces a transmission of visible light. The above-described functional layers may be arranged outside or inside the laminated glass 1.

The laminated glass 1 is used as a windshield of a vehicle in the present embodiment, but may be used as a rear glass or a side glass. Each of the rear glass and the side glass may have the first glass plate 2, and may not have the second glass plate 3 and the intermediate film 4. That is, each of the rear glass and the side glass may be single sheet glass rather than laminated glass 1.

The first glass plate 2 has an information acquisition area 21. The information acquisition area 21 is an area through which information outside the vehicle is acquired by the information acquisition apparatus 9. The information acquisition apparatus 9 includes, for example, a light receiving element that receives visible light or infrared light, and acquires an image outside the vehicle by the light receiving element. The information acquisition apparatus 9 is, for example, a camera such as a visible light camera or an infrared light camera, or a LiDAR (Light Imaging Detection and Ranging). The LiDAR measures a distance to an object and a direction of the object by emitting laser light and receiving reflected light from the object. The LiDAR scans the entire information acquisition area 21 with laser light.

The first glass plate 2 has the information acquisition area 21 as described above. The information acquisition area 21 is, for example, an opening portion of the light shielding film 5 and is surrounded on four sides by the light shielding film 5. The information acquisition area 21 may be surrounded only on three sides (upper side, right side, and left side) by the light shielding film 5, and the lower side of the information acquisition area 21 may be opened.

The second glass plate 3 also has an information acquisition area 31 in the same manner as the first glass plate 2. The information acquisition area 21 of the first glass plate 2 coincides with the information acquisition area 31 of the second glass plate 3. Therefore, the information acquisition area 21 of the first glass plate 2 will be described below, and the description of the information acquisition area 31 of the second glass plate 3 will be omitted.

As shown in FIG. 2, the first glass plate 2 or the like is mounted to the vehicle body in an inclined state. In this state, the information acquisition area 21 has a rectangular shape in the direction of the optical axis 9A of the information acquisition apparatus 9 as shown in FIG. 1, and has a horizontal upper side 22 and a horizontal lower side 23. Note that the trapezoidal shape shown in FIG. 1 includes, in addition to a trapezoidal shape in a mathematical sense, a shape that partially includes a curve, and a shape in which the upper side 22 and the lower side 23 intersect each other at an intersection angle of 10 degrees or less. The X-axis direction parallel to the upper side 22 and the lower side 23 is a lateral direction, and the Z-axis direction perpendicular to the lateral directions is the vertical direction. The Y-axis direction is a thickness direction. The positive side in the Y-axis direction is the inside of the vehicle, and the negative side in the Y-axis direction is the outside of the vehicle. When the information acquisition apparatus 9 scans with laser light, the optical axis 9A is an average direction of all directions to be scanned.

Figure 3:
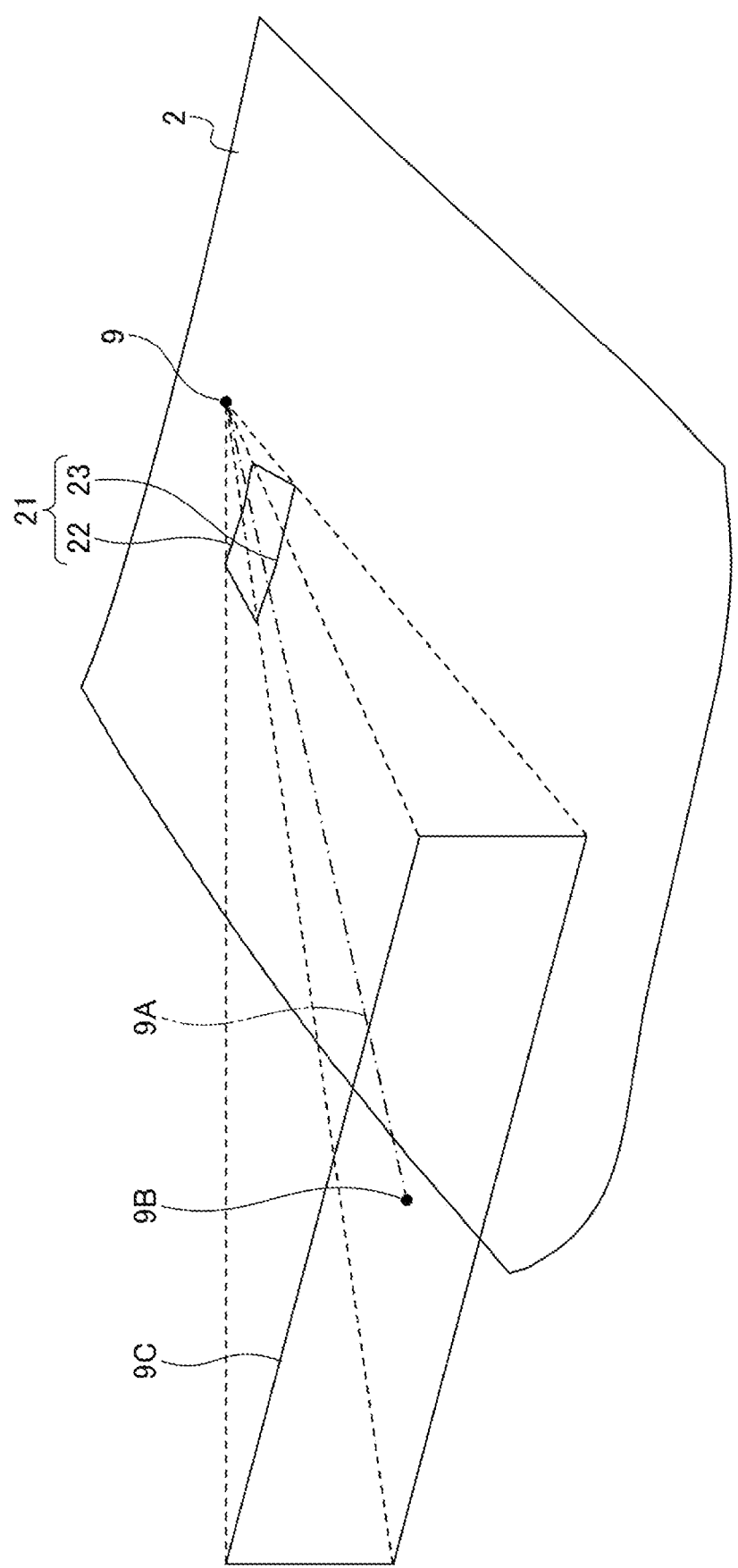
FIG. 3 is a perspective view depicting an example of the optical axis of the information acquisition apparatus in FIG. 2.

As shown in FIG. 3, the information acquisition apparatus 9 receives light from an entirety of a region 9C in a plane orthogonal to the optical axis 9A outside the information acquisition apparatus 9. The region 9C has a rectangular shape with a center 9B at the optical axis 9A. The information acquisition area 21 of the first glass plate 2 has a rectangular shape in the direction of the optical axis 9A because the first glass plate 2 is mounted to the vehicle body in an inclined state. The length of the lower side 23 is longer than the length of the upper side 22.

As shown in FIG. 4, the first glass plate 2 has a waviness in the lateral direction. This waviness occurs when the molten glass is formed into a plate. A float method, for example, is used for forming molten glass into a plate shape. In the float method, molten glass is continuously fed onto a liquid level of molten metal and formed into a strip shape while the molten glass is made to flow over a horizontal liquid level. The strip-shaped glass does not have waviness in the flow direction, but has waviness in the width direction. A waviness is a wave.

In FIG. 4, A is an antinode of a wave and B is a node of the wave. Waves are visible as streaks 29 (see FIG. 1). The streak 29 is caused by a waviness, and a pitch P1 of the streak 29 coincides with a cycle of waviness. The cycle of waviness may be, for example, from 5 mm to 50 mm. An amplitude of waviness is from 0.1 µm to 5 µm. The cycle and the amplitude of waviness can be measured with a commercially available surface roughness measurement apparatus.

Figure 5:
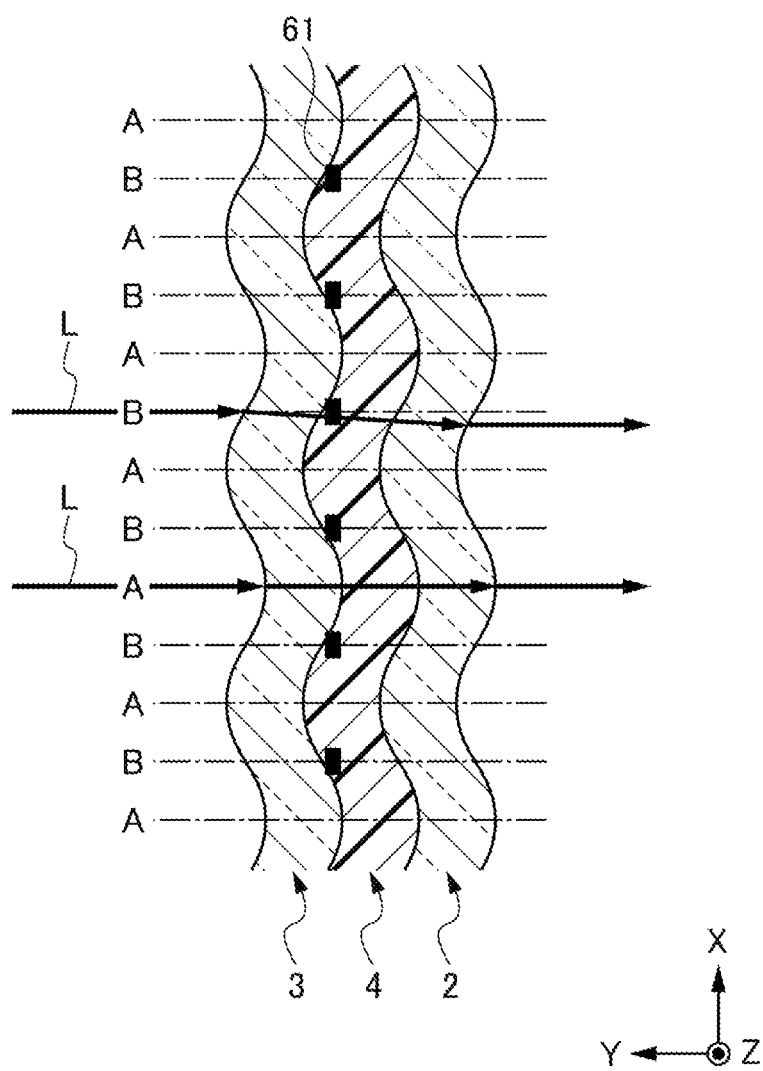
FIG. 5 is a cross-sectional view illustrating an example of a propagation path of light through the glass plate with an electric heating wire shown in FIG. 4.

The first glass plate 2 has a waviness in the lateral direction and does not have a waviness in the vertical direction. Therefore, as shown in FIG. 1, the plurality of streaks 29 of the first glass plate 2 are arranged in the lateral direction at intervals, each of which extends in the vertical direction. Therefore, as shown in FIG. 5, the phase difference of the waviness between the incident position and the exit position of light beam L is small, and variation in the exit direction of the light beam L is small.

Figure 19:
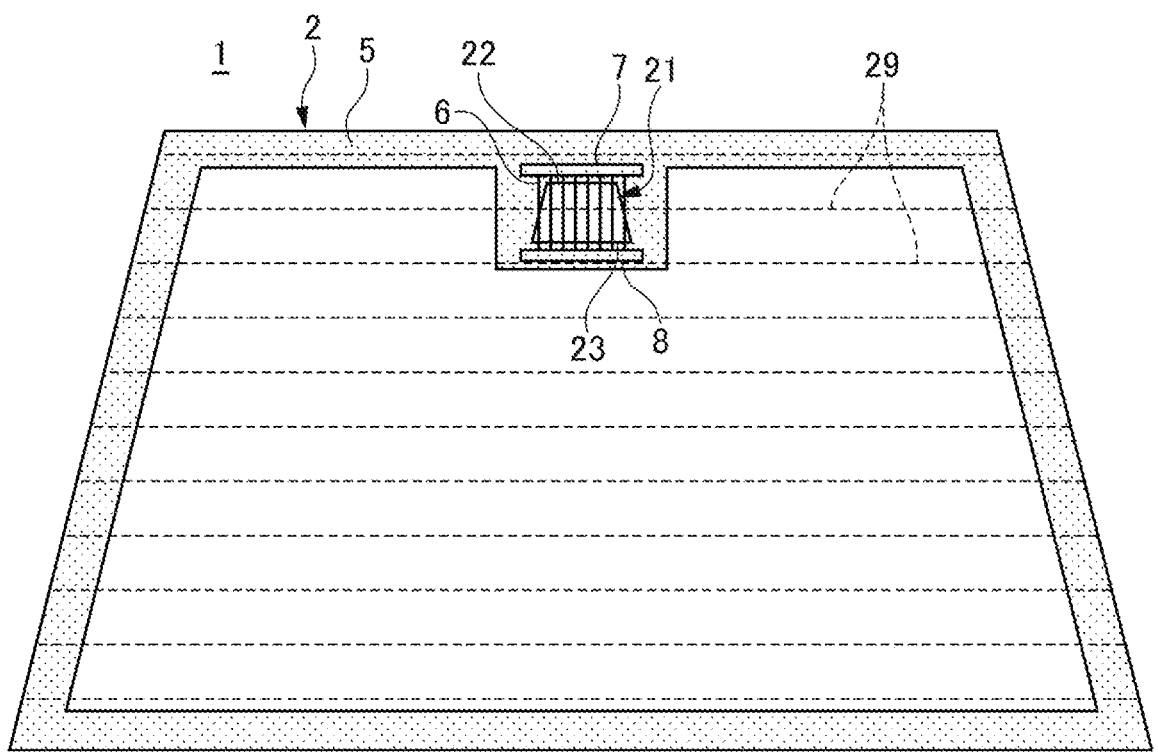
FIG. 19 is a diagram depicting an example of a glass plate with an electric heating wire according to a related art viewed from a direction of an optical axis of an information acquisition apparatus.
Figure 20:
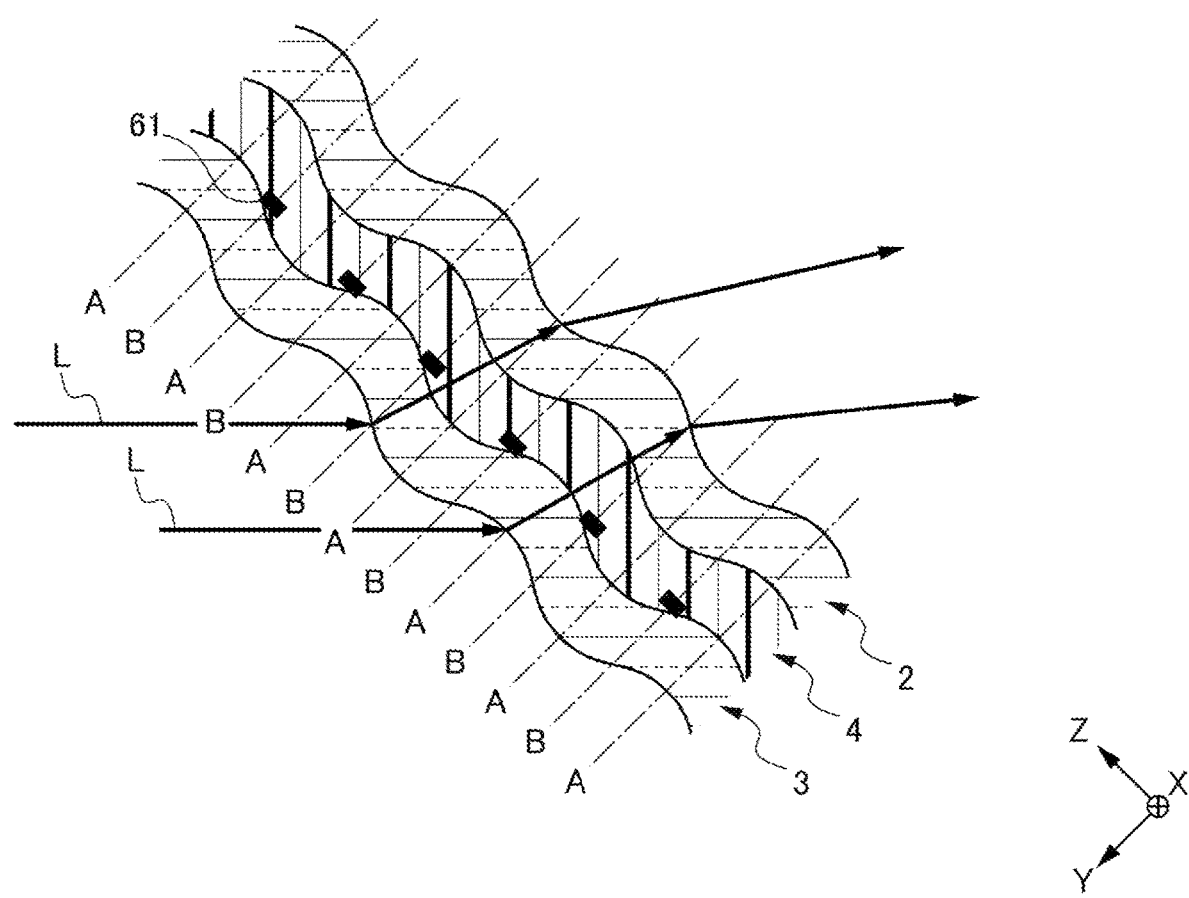
FIG. 20 is a cross-sectional view illustrating an example of a propagation path of light through the glass plate with an electric heating wire according to the related art.

On the other hand, according to the related art, as shown in FIG. 19, the plurality of streaks 29 of the first glass plate 2 are arranged in the vertical direction at intervals, each extending in the lateral direction. This indicates that the first glass plate 2 has a waviness in the vertical direction and does not have a waviness in the lateral direction. Therefore, as shown in FIG. 20, the phase difference of the waviness between the incident position and the exit position of light beam L is large, and variation in the exit direction of the light beam L is large. The variation in the exit direction is an influence of refraction.

According to the present embodiment, since the variation in the exit direction of the light beam L can be reduced compared to the related art as described above, the magnitude of the perspective distortion can be reduced. The perspective distortion is a distortion of a perspective image viewing through glass. The magnitude of the perspective distortion is measured in accordance with the JIS R 3212: 2015 perspective distortion test (5.12).

The second glass plate 3 has a plurality of streaks arranged in a width direction at intervals similar to the streaks 29 of the first glass plate 2, and may extend in the vertical direction. The perspective distortion can be further reduced. If the streaks of the second glass plate 3 extend in the vertical direction, the streaks 29 of the first glass plate 2 may extend in the lateral direction. At least one of the streaks 29 of the first glass plate 2 and the streaks 29 of the second glass plate 3 may extend in the vertical direction. As described above, the windowpane may be a single plate glass instead of the laminated glass 1, and in this case, the second glass plate 3 and the intermediate film 4 may not be included.

The laminated glass 1 is a glass plate with an electric heating wire and has an electric heating wire 6 provided in the information acquisition area 21. The material of the electric heating wire 6 is, for example, a pure metal selected from the group consisting of gold, silver, copper, aluminum, tin, iron, nickel, chromium, and tungsten, an alloy containing one or more metals selected from this group, carbon, or graphene, although the material of the electric heating wire 6 is not particularly limited as long as the material is a conductive material.

The electric heating wire 6 generates heat by power supply and removes fog and ice from the information acquisition area 21. For example, the electric heating wire 6 is disposed between the first glass plate 2 and the second glass plate 3, preferably between the intermediate film 4 and the second glass plate 3, and particularly preferably on the interior side surface of the second glass plate 3.

The electric heating wire 6 may be disposed between the first glass plate 2 and the second glass plate 3 while being supported on a base film. The base film improves the handleability of the electric heating wire 6. The base film is formed of a transparent resin and is formed of, for example, the same material as the intermediate film 4. However, the material of the base film may not exhibit adhesion to glass by heating, and may be, for example, polyethylene terephthalate (PET). In this case, an adhesive layer may be disposed between the base film and the first glass plate 2 or the second glass plate 3.

The electric heating wire 6 may be disposed on the interior side of the vehicle on the fourth side 14 of the laminated glass 1. The electric heating wire 6 may be disposed on the interior side of the fourth surface 14 of the laminated glass 1 while being supported on the base film. As described above, when the windowpane is a single-plate glass instead of the laminated glass 1, the electric heating wire 6 is disposed on the interior side of the first glass plate 2.

As shown in FIG. 7, the electric heating wire 6 has a vertical portion 61 that vertically traverses the information acquisition area 21. The plurality of vertical portions 61 are provided at intervals in the lateral direction and extend in the vertical direction. The vertical portions 61 are provided parallel to the streak 29. Further, the vertical portion 61 may be provided so as to vertically traverse the information acquisition area 21 and may be provided diagonally with respect to the streak 29, which will be described later in detail.

The vertical portion 61 may be a straight line, but may be a wavy line, such as a sinusoidal curve, as shown in FIG. 7 or the like, in order to suppress generation of a beam of light. A beam of light is a phenomenon in which streak-like light is visualized and is caused by diffraction and interference of light. A shift of phases of the adjacent vertical portions 61 can further reduce the generation of beam of light.

When the electric heating wire 6 generates heat, a temperature of the intermediate film 4 or the like increases and the refractive index decreases. Since the plurality of vertical portions 61 are arranged in the lateral direction at intervals, portions having a low refractive index and portions having a high refractive index are arranged in the lateral direction. The variation in the refractive index in the lateral direction is equivalent to the occurrence of waviness in the lateral direction from the viewpoint of the perspective distortion.

According to the present embodiment, since the refractive index varies in the lateral direction, the magnitude of the perspective distortion can be reduced compared to the case where the refractive index varies in the vertical direction. This is because the waviness in the lateral direction reduces the influence of refraction and reduces the magnitude of the perspective distortion, compared to the waviness in the vertical direction.

As shown in FIG. 4, a lateral pitch P2 of the vertical portion 61 is preferably 25 mm or less. If the pitch P2 is 25 mm or less, the intermediate film 4 is heated almost uniformly, the difference in the refractive indices is reduced, and the magnitude of the perspective distortion is reduced. The pitch P2 is more preferably 10 mm or less, more preferably 5 mm or less, and particularly preferably 2.5 mm or less.

The pitch P2 may be half a lateral pitch P1 of the streak 29 (P1/2) and the vertical portion 61 may be disposed at an antinode A or a node B of the waviness of the first glass plate 2. If the pitch P2 is half the pitch P1, the vertical portion 61 can be disposed at the node B when the phase of the waviness of the first glass plate 2 coincides with the phase of the waviness of the second glass plate 3, as shown in FIG. 4. For example, light beam L parallel to the Y-axis direction is obliquely incident in the node B, and the light beam is refracted, whereas light beam L is vertically incident in the antinode A, and the light beam is not refracted. When the electric heating wire 6 is energized, the temperature of the node B is high, so the refractive index of the node B is small, the amount of refraction in the node B is small, and the magnitude of the perspective distortion is small.

If the pitch P2 is half the value of the pitch P1, the vertical portion 61 can be disposed in the antinode A when the phase of the waviness of the first glass plate 2 and the phase of the waviness of the second glass plate 3 are shifted by n (half-wavelength) as shown in FIG. 6. Since the antinode A becomes a convex or concave lens, the parallel light is collected or diverged by the lens effect. When the electric heating wire 6 is energized, the temperature of the antinode A is high, so that the refractive index of the antinode A is small, the amount of refraction of the lens is small, and the magnitude of the perspective distortion is small.

As shown in FIG. 7, the laminated glass 1 has a first bus bar 7 for supplying a first potential to one end of the electric heating wire 6 and a second bus bar 8 for supplying a second potential different from the first potential to the other end of the electric heating wire 6. Any of the first potential and the second potential may be higher. The first and second bus bars 7 and 8 are formed of copper, aluminum, or the like, and are connected to the electric heating wire 6 with a conductive adhesive such as solder, to supply a voltage to the electric heating wire 6 and supply a current to the electric heating wire 6. The first bus bars 7 and the second bus bars 8 may be integrally formed with the same material as the electric heating wire 6 without using a conductive adhesive such as solder.

The plurality of electric heating wires 6 electrically connected to the first bus bar 7 and the second bus bar 8 have the same length and have the same electric resistance. The same length of the plurality of heating wires 6 means that a difference between the maximum length and the minimum length of the plurality of heating wires 6 is 5% or less of the average value of the length. Thus, the same voltage and the same current can be supplied to each of the plurality of electric heating wires 6, and the same power (a product of the voltage and the current) can be supplied to the wire. Therefore, heating irregularities can be reduced.

The pattern of the electric heating wire 6 is not limited to the pattern shown in FIG. 7. Hereinafter, the pattern of the electric heating wire 6 will be described with reference to FIGS. 8 to 16.

Figure 8:
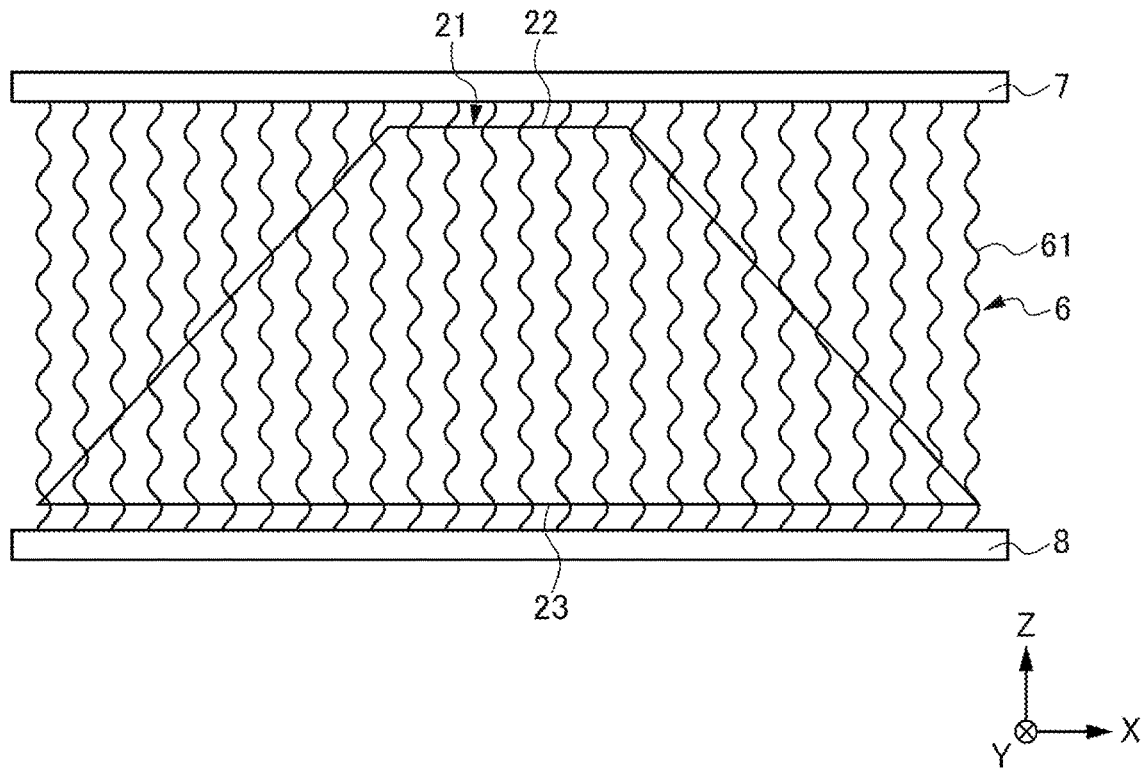
FIG. 8 is a diagram depicting a second example of the pattern of the electric heating wire viewed in the Y-axis direction.
Figure 9:
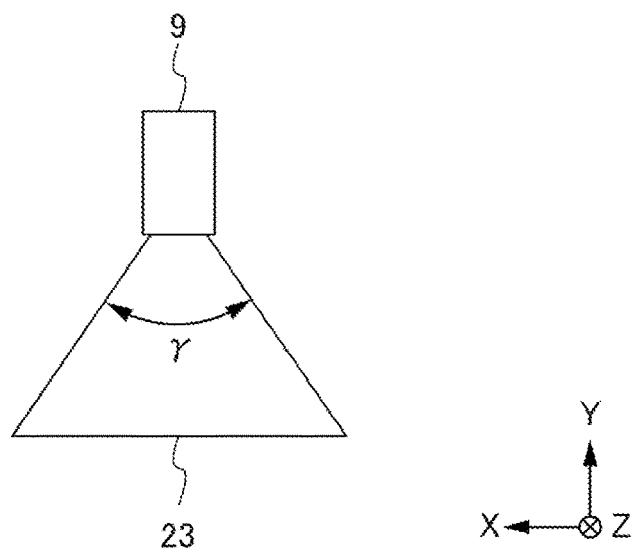
FIG. 9 is a diagram illustrating a relationship between an angle of view of the information acquisition apparatus and the lower side of the information acquisition area shown in FIG. 8.

The plurality of electric heating wires 6 shown in FIG. 8 are arranged in the lateral direction at intervals in the same manner as the electric heating wires 6 shown in FIG. 7, but are arranged over a wider range than the electric heating wires 6 shown in FIG. 7. This is because the length of the lower side 23 of the information acquisition area 21 is longer. The length of the lower side 23 is, for example, 50 mm or more. If the length of the lower side 23 is 50 mm or more, the image angle γ of the information acquisition apparatus 9 is large, as shown in FIG. 9, so that the incident angle of the light beam L is large near both ends of the information acquisition area 21 in the lateral direction, and significantly affected by refraction. Accordingly, the effect of applying the technique of the present disclosure is notable. The length of the lower side 23 is preferably 70 mm or more, more preferably 100 mm or more, further preferably 150 mm or more, even more preferably 200 mm or more, and particularly preferably 300 mm or more. The length of the lower side 23 is preferably 400 mm or less.

Figure 10:
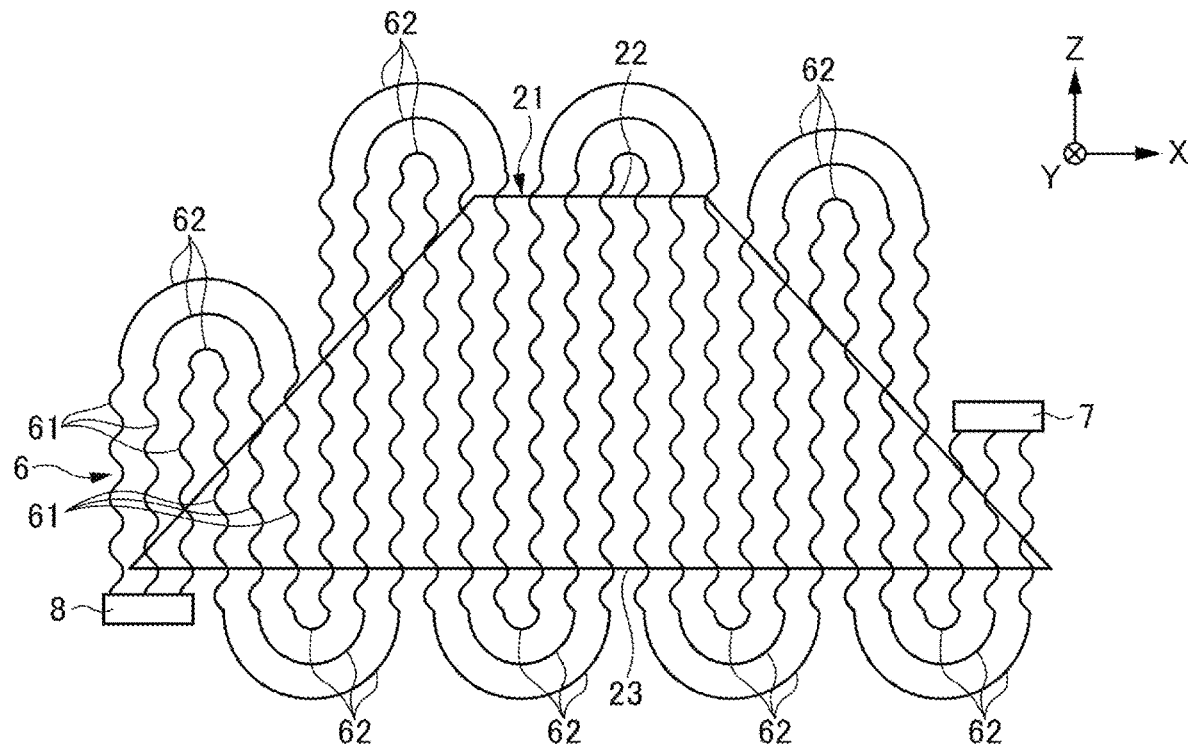
FIG. 10 is a diagram depicting a third example of the pattern of the electric heating wire viewed in the Y-axis direction.

FIG. 10 shows three electric heating wires 6, each of which is zigzagged over the entire information acquisition area 21 in the lateral direction. Incidentally, the number of electric heating wires 6 is not limited to three, but may be more than one. Each of the plurality of electric heating wires 6 has a U-shaped folding portion 62 in addition to the vertical portion 61. The folding portion 62 has a radius of curvature different from that of the other folding portion 62 so as not to interfere with the other folding portion 62, bypassing the other folding portion 62, and electrically connecting the upper ends of the plurality of vertical portions 61 to each other respectively, and connecting the lower ends of the plurality of vertical portions 61 to each other respectively. Since the electric heating wires 6 are provided in zigzag over the entire information acquisition area 21 in the lateral direction, the first bus bar 7 and the second bus bar 8 may be provided at the left end or the right end of the information acquisition area 21, thereby reducing the lateral length of the first bus bar 7 and the second bus bar 8.

Figure 11:
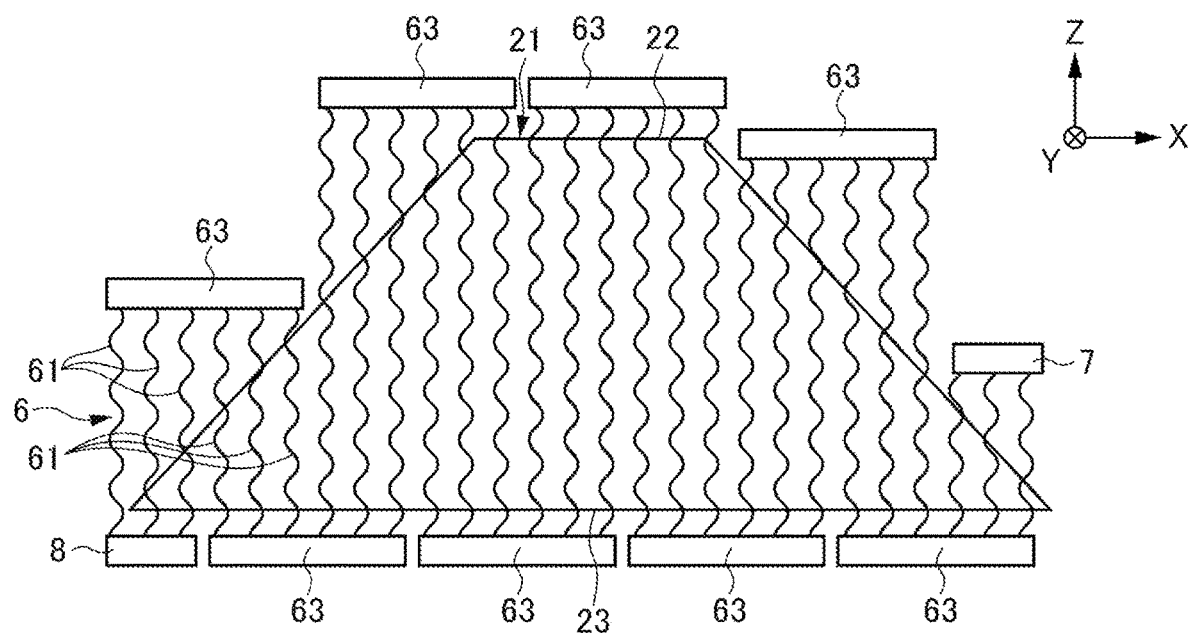
FIG. 11 is a diagram depicting a fourth example of the pattern of the electric heating wire viewed in the Y-axis direction.

Instead of the U-shaped folding portion 62 shown in FIG. 10, a horizontal portion 63 shown in FIG. 11 may be provided. The horizontal portions 63 provide the same electrical potential to the upper ends of the plurality of vertical portions 61 respectively and provide the same electrical potential to the lower ends of the vertical portions 61 respectively. In lieu of the U-shaped folding portion 62, the horizontal portion 63 shown in FIG. 11 is provided, so that it is possible to shorten lengths of the portions that extend outside the information acquisition area 21 of the electric heating wire 6. Accordingly, it is possible to reduce unnecessary power consumption.

Figure 12:
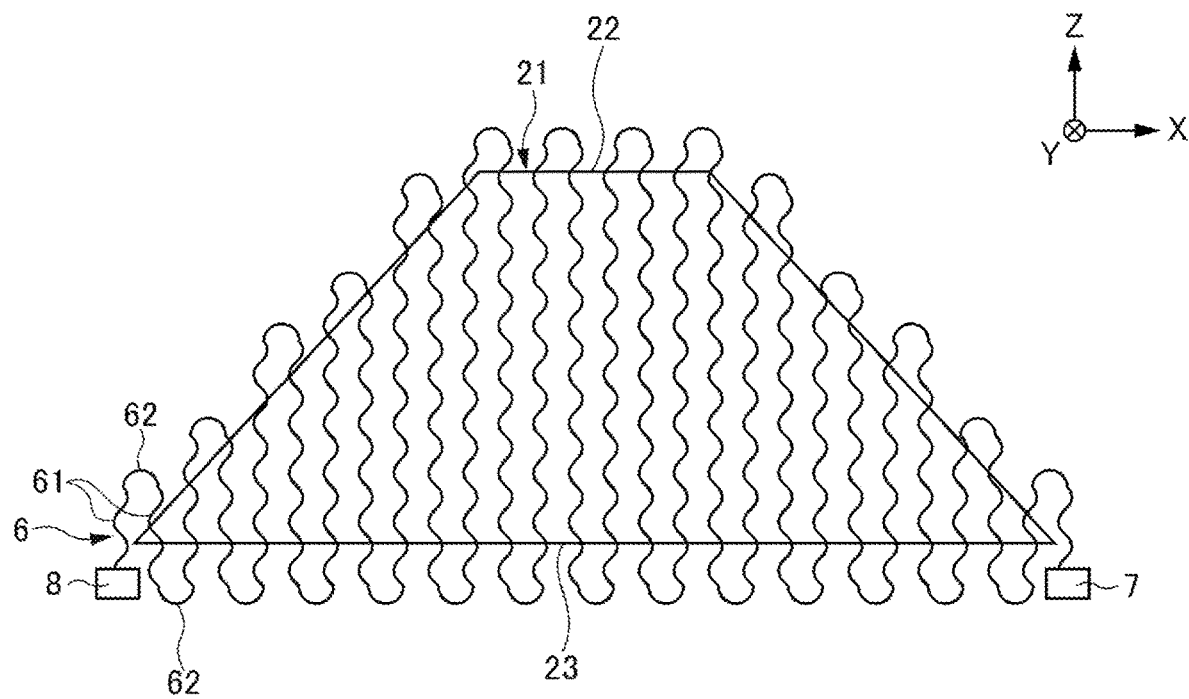
FIG. 12 is a diagram depicting a fifth example of the pattern of the electric heating wire viewed in the Y-axis direction.

The electric heating wire 6 shown in FIG. 12 is provided in zigzag over the entire information acquisition area 21 in the lateral direction. The electric heating wire 6 includes U-shaped folding portions 62 in addition to the vertical portions 61. Each of the folding section 62 electrically connects upper ends of two adjacent vertical portions 61 or lower ends of two adjacent vertical portions. If the number of heat wires 6 is one, the folding portion 62 does not have to bypass the other folding portion 62. Therefore, the length of the folding portion 62 can be reduced, and the length of the portion that extends outside the information acquisition area of the electric heating wire 6 can be reduced. Accordingly, it is possible to reduce an unnecessary power consumption.

A ratio of a total length of the electric heating wire 6 outside the information acquisition area 21 to a total length of the electric heating wire 6 inside and outside the information acquisition area 21 preferably falls within a range from 0% to 20%. When the percentage is 20% or less, an unnecessary power consumption can be minimized. The percentage is more preferably 15% or less, and particularly preferably 10% or less.

Figure 13:
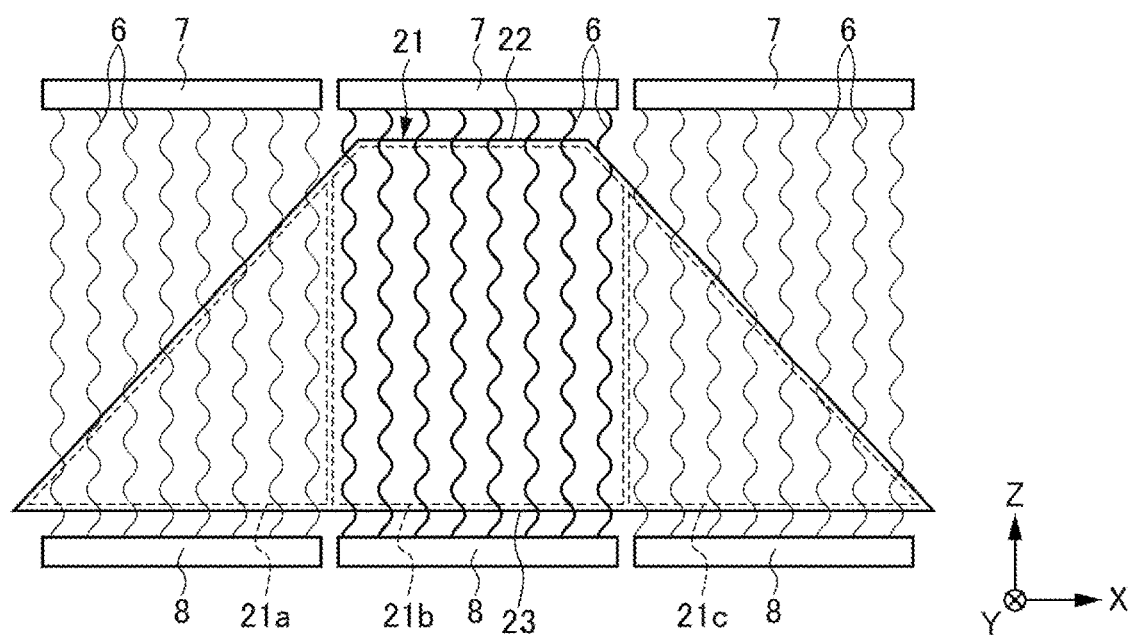
FIG. 13 is a diagram depicting a sixth example of the pattern of the electric heating wire viewed in the Y-axis direction.

FIG. 13 shows the plurality of electric heating wires 6 arranged in the lateral direction at intervals, and have an electric resistance corresponding to the lateral position. The information acquisition area 21 includes a first outer region 21a, a central region 21b, and a second outer region 21c in this order in the lateral direction. In the first outer region 21a and the second outer region 21c, the angle of incidence of the light beam L is larger than that in the central region 21b, so that the first outer region 21a and the second outer region 21c are easily affected by refraction.

Therefore, each of the electric heating wires 6 disposed in the first outer region 21a and the second outer region 21c have a higher electric resistance than each of the electric heating wires 6 disposed in the central region 21b. If the voltage is the same, the higher the electric resistance, the lower the heat generation. Therefore, in the first outer region 21a and the second outer region 21c, the temperature change is smaller than that in the central region 21b, so that the change in the amount of refraction due to the temperature change can be reduced.

Each of the electric heating wires 6 disposed in the first outer region 21a and the second outer region 21c shown in FIG. 13 has a smaller cross-sectional area than that of each of the electric heating wires 6 disposed in the central region 21b. The cross-sectional area is an area of a cross-section of the wire perpendicular to the vertical direction. The smaller the cross-sectional area, the greater the electric resistance. At least one of a line width and a thickness of each of the electric heating wires 6 disposed in the first outer region 21a and the second outer region 21c (line width in FIG. 13) is smaller than that of each of the electric heating wires 6 disposed in the central region 21b.

Figure 14:
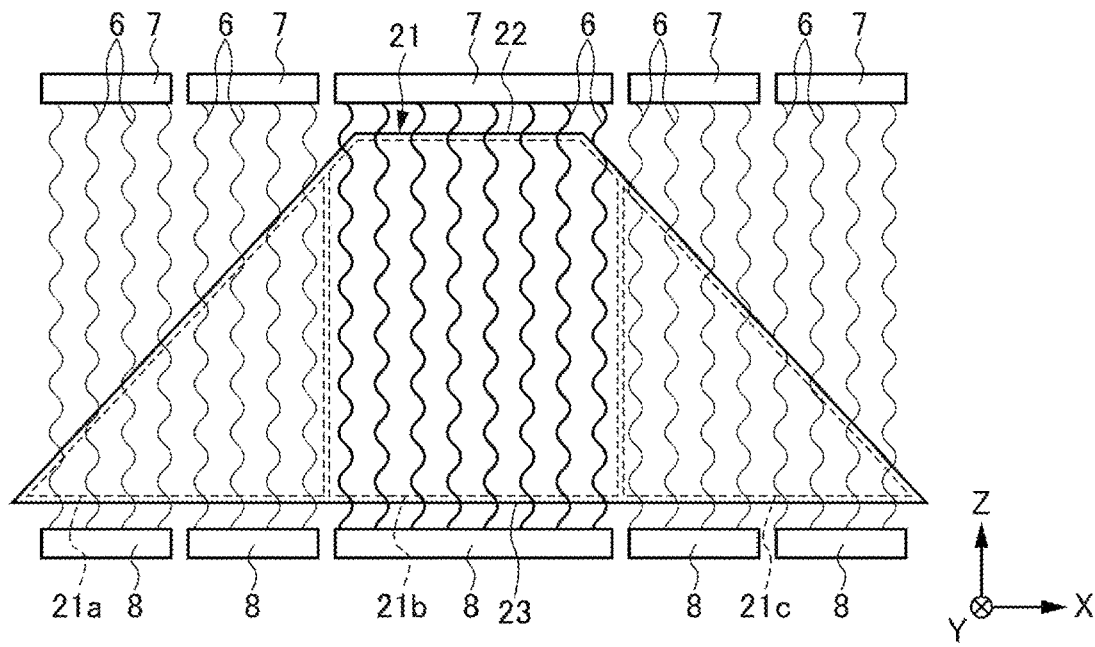
FIG. 14 is a diagram depicting a seventh example of the pattern of the electric heating wire viewed in the Y-axis direction.

Since the information acquisition area 21 is divided into three areas 21a, 21b, and 21c, three first bus bars 7 and three second bus bars 8 may be provided, as shown in FIG. 13. The number of the first bus bars 7 and the number of the second bus bars 8 are not limited to three. For example, the numbers may be five as shown in FIG. 14, may be seven or more, and may be one.

Figure 15:
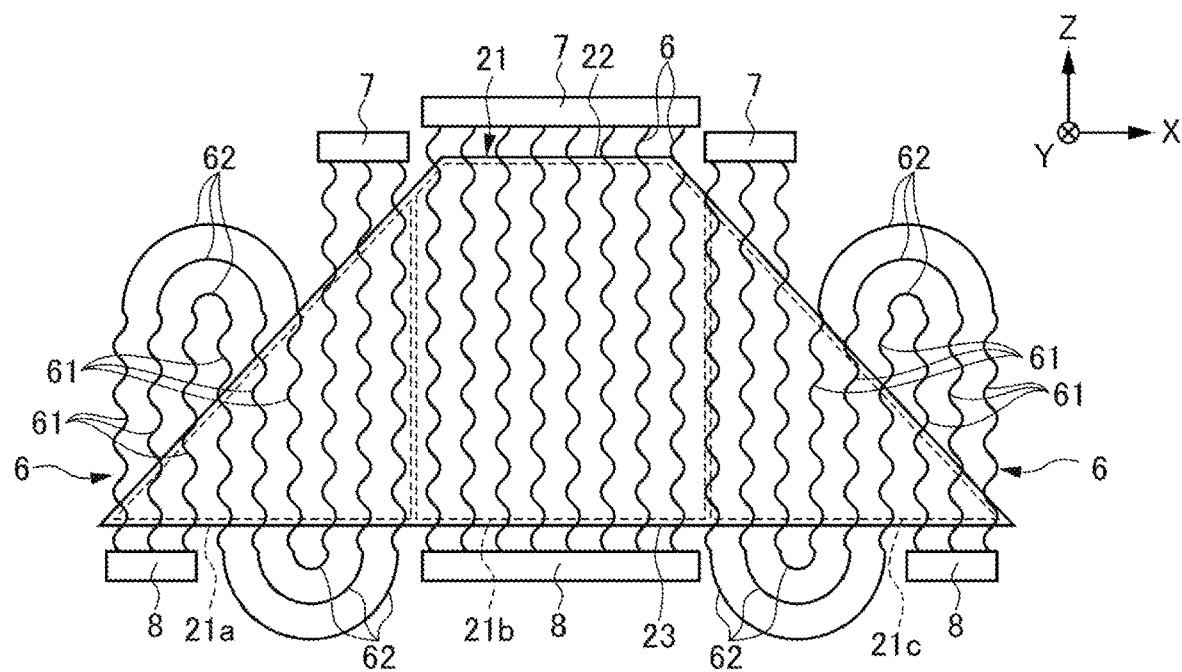
FIG. 15 is a diagram depicting an eighth example of the pattern of the electric heating wire viewed in the Y-axis direction.

The length of each of the electric heating wires 6 disposed in the first outer region 21a and the second outer region 21c shown in FIG. 15 may be longer than the length of each of the electric heating wires 6 disposed in the central region 21b. The longer the length of each wire, the greater the electric resistance of each wire. Although the electric heating wires 6 shown in FIG. 15 have folding portions 62, the electric heating wires 6 may have horizontal portions 63 as shown in FIG. 11 instead of the folding portions 62.

Meanwhile, because the angle of incidence a of the light beam L increases from the upper side 22 toward the lower side 23 of the information acquisition area 21, as can be seen from FIG. 2, the influence of refraction becomes greater.

Figure 16:
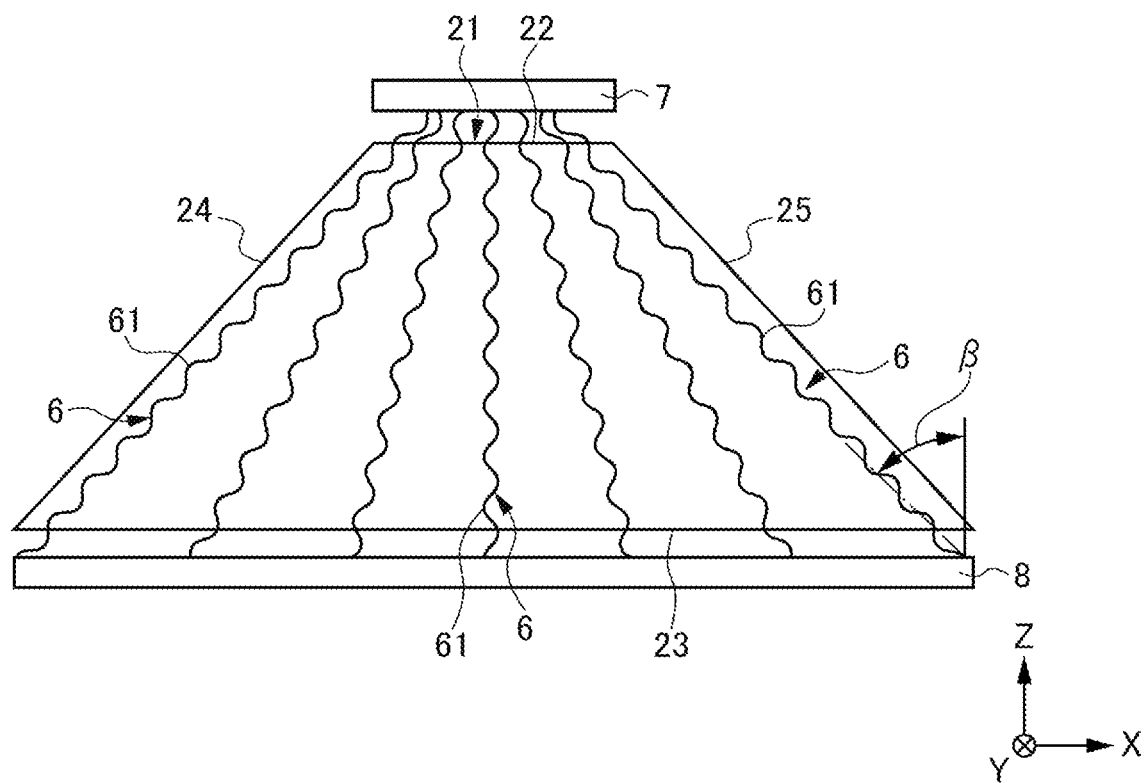
FIG. 16 is a diagram depicting a ninth example of the pattern of the electric heating wire viewed in the Y-axis direction.

Therefore, from the upper side 22 toward the lower side 23 of the information acquisition area 21, as shown in FIG. 16, the pitch in the lateral direction of the vertical portions 61 of the electric heating wires 6 increases. The larger the pitch in the lateral direction of the vertical portions 61, the smaller the temperature change, and thus the change in the amount of refraction due to the temperature change can be reduced.

Figure 17:
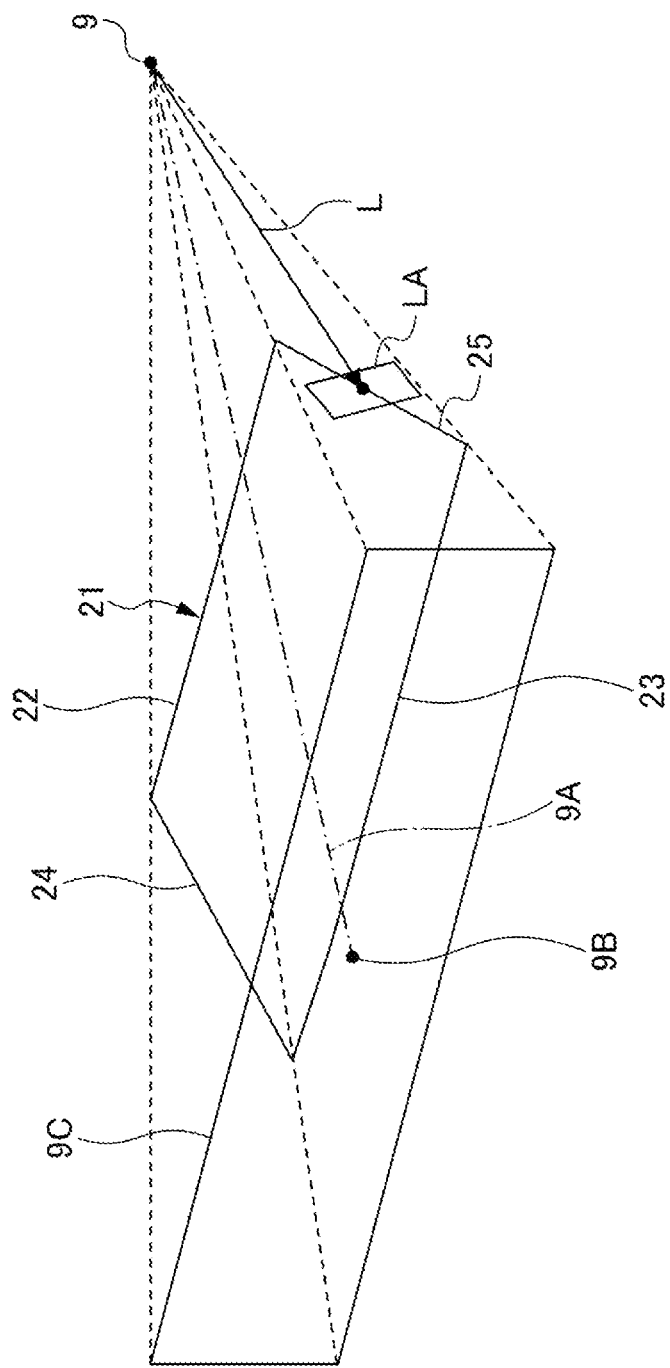
FIG. 17 is a perspective view depicting an example of an incident surface at a midpoint of the right side of the information acquisition area shown in FIG. 16.

The vertical portion 61 shown in FIG. 16 extends in the vertical direction in the middle of the lateral direction of the information acquisition area 21, and is inclined with respect to the vertical direction in the vicinity of the end in the lateral direction of the information acquisition area 21. The vertical portion 61 is parallel to the left side 24 in the vicinity of the left side 24 of the information acquisition area 21, and parallel to the right side 25 in the vicinity of the right side 25 of the information acquisition area 21. As shown in FIG. 17, the entirety of the electric heating wire 6 disposed near the right side 25 of the information acquisition area 21 is included within a region of an incident surface LA of the light beam L incident near the right side 25 of the information acquisition area 21. That is, an intersection line of the incident surface LA and the first glass plate 2 approximately coincides with the right side 25. As a result, the change in the amount of refraction due to the temperature change can be reduced.

As described above, the vertical portion 61 is inclined with respect to the vertical direction near the end in the lateral direction of the information acquisition area 21. The inclination angle β is, for example, 15° or more, preferably 20° or more, more preferably 30° or more, further preferably 40° or more, even more preferably 50°, and particularly preferably 60°. The inclination angle β is 70° or less. When the vertical portion 61 is a sine curve, an angle formed by a central line of an amplitude and the vertical line is the inclination angle β.

As described above, from the upper side 22 toward the lower side 23 of the information acquisition area 21, the pitch in the lateral direction of the vertical portions 61 of the electric heating wires 6 increases, as shown in FIG. 16. Therefore, the density of the vertical portions 61 decreases from the upper side 22 toward the lower side 23 of the information acquisition area 21.

The cross-sectional area of the electric heating wire 6 shown in FIG. 16 may be reduced from the upper side 22 of the information acquisition area 21 toward the lower side 23. The smaller the cross-sectional area, the greater the electric resistance per unit length and the larger the heat generation. Therefore, heating unevenness can be reduced.

EXAMPLE

In Examples 1 to 10, the laminated glass 1 was produced under the same conditions except that the direction of the streaks in the first glass plate 2 and the second glass plate 3 and the pattern of the electric heating wires 6 were set as shown in TABLE 1, and the magnitude of the perspective distortion of the laminated glass 1 was measured. The size of the laminated glass 1 was the same as the size of the information acquisition area 21, i.e., 300 mm long and 300 mm wide. The thickness of the first glass plate 2 and the thickness of the second glass plate 3 were both 2 mm. The thickness of the intermediate film 4 was 0.76 mm. The wire diameter of the electric heating wire 6 was 20 μm. The pitch P1 in the lateral direction of the vertical portion 61 of the electric heating wire 6 at the upper side 22 of the information acquisition area 21 was 3 mm. In Example 9 and Example 10, the pattern of the electric heating wire 6 was the pattern shown in FIG. 16. In Example 9, the cross-sectional area of the electric heating wire 6 was constant, while in Example 10, the cross-sectional area of the electric heating wire 6 decreases from the upper side 22 of the information acquisition area 21 toward the lower side 23. Example 1 is a comparative example, and Examples 2 to 10 are practical examples.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Direction of streak | | Lateral | Vertical | Vertical | Vertical | Vertical | Vertical | Vertical | Vertical | Vertical | Vertical |
| Pattern of electric heating wires | | FIG. 7 | FIG. 7 | FIG. 8 | FIG. 10 | FIG. 12 | FIG. 13 | FIG. 14 | FIG. 15 | FIG. 16 | FIG. 16 |
| Perspective distortion (min) | Non-energized/ center | B 0.7 | B 0.3 | B 0.2 | B 0.3 | B 0.3 | B 0.4 | B 0.3 | B 0.4 | B 0.3 | B 0.3 |
| | Non-energized/ end | B 0.8 | B 0.3 | B 0.3 | B 0.3 | B 0.3 | B 0.3 | B 0.2 | B 0.3 | B 0.2 | B 0.4 |
| | Energized/ center | C 2.2 | B 1.8 | B 1.7 | B 1.8 | B 1.6 | B 1.9 | B 1.7 | B 1.9 | B 1.8 | B 1.9 |
| | Energized/ end | C 2.3 | B 1.6 | B 1.8 | B 1.8 | B 1.9 | B 1.8 | A 1.3 | A 1.4 | A 1.3 | A 1.5 |
| L2/L0 × 100 | | B 25 | B 25 | B 33 | A 20 | A 5 | B 33 | B 33 | A 15 | A 5 | A 5 |

Figure 18:
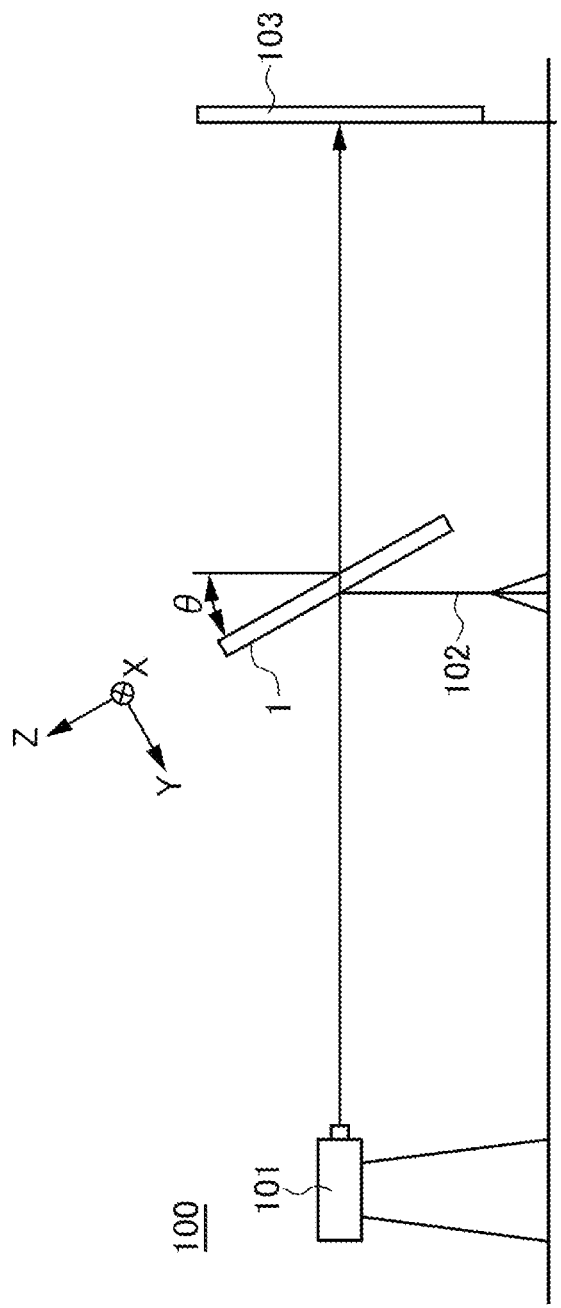
FIG. 18 is a diagram illustrating an example of a method for measuring a perspective distortion.

The magnitude of the perspective distortion shown in TABLE 1 was measured in accordance with the JIS R 3212:2015 perspective distortion test (5.12), and using a testing apparatus 100 shown in FIG. 18. The testing apparatus 100 includes a projector 101, a support platform 102 and a screen 103. The projector 101 projects an image of a water ball pattern in which a plurality of complete circles are arranged in a staggered form through a laminated glass 1 in an inclined state onto the screen 103. The support platform 102 supports the laminated glass 1 in the inclined state. The distance between the laminated glass 1 and the screen 103 was 4 m. The inclination angle θ of the laminated glass 1 was 25°.

The magnitude of the perspective distortion was obtained by measuring the maximum amount of distortion from a complete circle and converting it into "minutes," which is a unit of angle. An index "A" in the evaluation indicates that the magnitude of the perspective distortion is less than or equal to 1.5 minutes, an index "B" in the evaluation indicates that the magnitude of the perspective distortion is greater than 1.5 minutes and less than or equal to 2.0 minutes, and an index "C" in the evaluation indicates that the magnitude of the perspective distortion is greater than 2.0 minutes. The magnitude of the perspective distortion was measured at the center of the information acquisition area 21 in the lateral direction, and at the end of the information acquisition area 21 in the lateral direction. The magnitude was measured when an electric power is not supplied (non-energized) and when an electric power is supplied (energized).

In TABLE 1, L0 is a total length of the electric heating wires 6 inside and outside the information acquisition area 21, and is a sum of L1 and L2, which will be described later. L1 is a total length of the electric heating wire 6 inside the information acquisition area 21. On the other hand, L2 is a total length of the electric heating wire 6 outside the information acquisition area 21. An index "A" of the evaluation indicates that the ratio of L2 to L0 is less than or equal to 20%, and an index "B" of the evaluation indicates that the ratio of L2 to L0 is greater than 20%.

As is clear from TABLE 1, different from Example 1, in Examples 2 to 10, since directions of streaks in the first glass plate 2 and in the second glass plate 3 were the vertical direction, the magnitude of the perspective distortion in the energized state was less than or equal to 2.0. Further, according to Examples 7 to 10, the magnitude of the perspective distortion in the energized state at the lateral end of the information acquisition area 21 was small, i.e., less than or equal to 1.5. Further, according to Examples 4, 5, and 8 to 10, the ratio of L2 to L0 was less than or equal to 20%, and unnecessary power consumption was small.

As described above, a glass plate with an electric heating wire in accordance with the present disclosure has been described. However, the present invention is not limited to the above-described embodiments. Various variations, modifications, replacements, additions, deletions, and combinations may be made without departing from the scope recited in claims. They are of course within the technical scope of the present disclosure.

For example, the ratio of L2 to L0 is preferably 15% or less, and more preferably 10% or less.

What is claimed is:

1. A glass plate comprising: a first glass plate having an information acquisition area through which information outside a vehicle is acquired by an information acquisition apparatus; an electric heating wire provided in the information acquisition area, a second glass plate facing the first glass plate: and an intermediate film bonding the first glass plate and the second glass plate, wherein the electric heating wire is provided between the glass plate and the second glass plate, when the first glass plate and the second glass plate are mounted to a vehicle body in an inclined state, the information acquisition area has a rectangular shape viewed from a direction of an optical axis of the information acquisition apparatus, and has a horizontal upper side and a horizontal lower side, a plurality of first streaks caused by waviness of the first glass plate are arranged at intervals in a lateral direction parallel to the horizontal upper side and the horizontal lower side, each first streak extending in a vertical direction perpendicular to the lateral direction, the electric heating wire comprises a plurality of vertical portions provided at intervals in the lateral direction, each vertical portion vertically traverses the information acquisition area, a plurality of second streaks caused by waviness of the second glass plate are arranged at intervals in the lateral direction, each second streak extending in the vertical direction, and a cycle of the waviness of each of the first glass plate and the second glass plate is from 5 mm to 50 mm and an amplitude of the waviness of each of the first glass plate and the second glass plate is from 0.1 µm to 5 µm.

2. The glass plate according to claim 1, wherein
a length of the lower side of the information acquisition area is greater than a length of the upper side, and the length of the lower side is greater than or equal to 50 mm and less than or equal to 400 mm.

3. The glass plate according to claim 1, wherein
a ratio of a total length of the electric heating wire outside the information acquisition area to a total length of the electric heating wire inside and outside the information acquisition area is greater than or equal to 0% and less than or equal to 20%.

4. The glass plate according to claim 1 further comprising: a first bus bar for supplying a first potential to one end of the electric heating wire; and a second bus bar for supplying a second potential different from the first potential to another end of the electric heating wire, wherein a plurality of electric heating wires electrically connected to the first bus bar and the second bus bar have a same length and have a same electric resistance.

5. The glass plate according to claim 1, wherein a single electric heating wire is provided so as to zigzag with respect to the lateral direction over an entirety of the information acquisition area.

6. The glass plate according to claim 1, wherein
the information acquisition area includes a first outer region, a central region, and a second outer region in this order in the lateral direction, and
an electric resistance of each of the electric heating wires disposed in the first outer region and the second outer region is greater than an electric resistance of each of the electric heating wires disposed in the central region.

7. The glass plate according to claim 6, wherein
a cross-sectional area of each of the electric heating wires disposed in the first outer region and the second outer region is smaller than a cross-sectional area of each of the electric heating wires disposed in the central region.

8. The glass plate according to claim 6, wherein
each of the electric heating wires disposed in the first outer region and the second outer region is longer than each of the electric heating wires disposed in the central region.

9. The glass plate according to claim 1, wherein
a pitch of the vertical portions in the lateral direction increases from the upper side of the information acquisition area to the horizontal lower side.

10. The glass plate according to claim 9, wherein
a cross-sectional area of each of the vertical portions decreases from the upper side of the information acquisition area to the horizontal lower side.

11. The glass plate according to claim 1, wherein
a pitch of the vertical portions in the lateral direction is less than or equal to 25 mm.

12. A glass plate comprising:
a first glass plate having a first information acquisition area through which information outside a vehicle is acquired by an information acquisition apparatus;

a second glass plate facing the first glass plate having a second information acquisition area through which information outside the vehicle is acquired by the information acquisition apparatus;

an intermediate film bonding the first glass plate and the second glass plate; and an electric heating wire provided in the first information acquisition area or the second information acquisition area, wherein when the first glass plate and the second glass plate are mounted to a vehicle body in an inclined state, the first information acquisition area and the second information acquisition area have rectangular shapes viewed from a direction of an optical axis of the information acquisition apparatus, and have horizontal upper sides and horizontal lower sides, respectively, a plurality of streaks caused by waviness of at least one of the first glass plate and the second glass plate are arranged at intervals in a lateral direction parallel to the upper side and the lower side, each streak extending in a vertical direction perpendicular to the lateral direction, the electric heating wire comprises a plurality of vertical portions are provided at intervals in the lateral direction, each vertical portion traverses the first information acquisition area or the second information acquisition area, and a cycle of the waviness of each of the first glass plate and the second glass plate is from 5 mm to 50 mm and an amplitude of the waviness of each of the first glass plate and the second glass plate is from 0.1 μm to 5 μm.

\* \* \* \* \*